(12) United States Patent
Maamoun (10) Patent No.: US 8,843,099 B2
(45) Date of Patent: Sep. 23, 2014

(54) METHOD FOR PROVIDING EXTENSION LIST SELECTION

(75) Inventor: Mohamed Mahmoud Maamoun, Kanata (CA)

(73) Assignee: BlackBerry Limited, Waterloo (CA)

( * ) Notice: Subject to any disclaimer, the term of this patent is extended or adjusted under 35 U.S.C. 154(b) by 562 days.

(21) Appl. No.: 12/640,145

(22) Filed: Dec. 17, 2009

(65) Prior Publication Data

US 2011/0151933 A1 Jun. 23, 2011

(51) Int. Cl.
*H04M 9/00* (2006.01)
*H04M 1/2745* (2006.01)
*H04M 1/56* (2006.01)

(52) U.S. Cl.
CPC .......... *H04M 1/274558* (2013.01); *H04M 1/56* (2013.01)
USPC ........ 455/401; 455/564; 455/407; 455/432.3; 379/93.05

(58) Field of Classification Search
CPC .............. H04M 1/00; H04M 1/72583; H04M 1/72563; H04M 3/46; H04W 4/16; H04W 76/02
USPC ............. 455/564, 401, 407, 432.3; 379/93.05
See application file for complete search history.

(56) References Cited

U.S. PATENT DOCUMENTS

| | | | |
|---|---|---|---|
| 5,384,825 A | 1/1995 | Dillard et al. | |
| 6,026,158 A | 2/2000 | Bayless et al. | |
| 6,266,543 B1 * | 7/2001 | Chen .......................... | 455/569.1 |
| 7,231,229 B1 | 6/2007 | Hawkins et al. | |
| 8,108,007 B1 * | 1/2012 | Wick et al. .................... | 455/566 |
| 2002/0187815 A1 | 12/2002 | Deeds et al. | |
| 2003/0048892 A1 * | 3/2003 | Murai .......................... | 379/242 |
| 2005/0020286 A1 * | 1/2005 | Lazaridis et al. ............. | 455/466 |
| 2005/0152511 A1 * | 7/2005 | Stubley ....................... | 379/88.01 |
| 2005/0210148 A1 * | 9/2005 | Kato et al. .................... | 709/244 |
| 2005/0243809 A1 * | 11/2005 | Best et al. ..................... | 370/356 |
| 2005/0250546 A1 | 11/2005 | Asthana | |
| 2006/0224995 A1 * | 10/2006 | Treibach-Heck et al. ..... | 715/816 |
| 2007/0077920 A1 * | 4/2007 | Weeks et al. ................ | 455/414.1 |
| 2008/0137628 A1 * | 6/2008 | Matsumoto et al. .......... | 370/338 |
| 2008/0155171 A1 * | 6/2008 | Jeong ............................ | 711/101 |

(Continued)

FOREIGN PATENT DOCUMENTS

| | | |
|---|---|---|
| EP | 1594294 | 11/2005 |
| WO | 03049460 | 6/2003 |
| WO | 2006052178 | 5/2006 |

OTHER PUBLICATIONS

European Patent Office, Extended European Search Report for EP Patent App. No. 09179700.1, May 26, 2010.

(Continued)

*Primary Examiner* — Kashif Siddiqui
*Assistant Examiner* — Mong-Thuy Tran
(74) *Attorney, Agent, or Firm* — Steven M. Greenberg, Esq.; CRGO Law (57) ABSTRACT

The disclosure is directed at a method of providing extension list dialing in a mobile communication device comprising storing a plurality of extensions within a single address book entry; sensing dialing of a phone number associated with the single address book entry; sensing connection between the mobile communication device and the phone number to establish a call; and displaying a screen dialog with each of the plurality of extensions for selection of one of the plurality of extensions.

16 Claims, 7 Drawing Sheets

(56) References Cited

U.S. PATENT DOCUMENTS

| | | | |
|---|---|---|---|
| 2009/0161842 A1* | 6/2009 | Sylvain | 379/93.05 |
| 2010/0113071 A1* | 5/2010 | Iguchi et al. | 455/462 |
| 2010/0166169 A1* | 7/2010 | Ma | 379/216.01 |
| 2010/0312793 A1* | 12/2010 | Brown et al. | 707/770 |
| 2011/0110511 A1* | 5/2011 | Vendrow et al. | 379/201.04 |

OTHER PUBLICATIONS

European Patent Office, Examination Report for European Patent App. No. 09179700.1, Feb. 4, 2013.

* cited by examiner

| Entry Number | First Name | Last Name | Address | Phone Number | Ext(s) | ... | E-mail |
|---|---|---|---|---|---|---|---|
| 1 | John | Doe | 111 Main St. | 917-1621 | x67 | ... | JD@aol.com |
| 2 | Tom | Smith | 12 Yonge St. | 497-6690 | ... | ... | TommyS@hotmail.com |
| 3 | IT | Dept. | 117 University Ave. | 617-3251 | x922 Terry x 945 Will x 961 Joe | ... | Ithelp@help.com |
| . . . | . . . | . . . | . . . | . . . | . . . | ... | . . . |
| n | Bob | White | 96217 Bank St. | 272-4568 | ... | ... | |
| n-1 | Help | Desk | 10 Broadway Rd. | 351-8061 | ... | ... | HD@yahoo.com |

METHOD FOR PROVIDING EXTENSION LIST SELECTION

FIELD OF THE DISCLOSURE

The present disclosure relates generally to mobile communication devices. More particularly, the present disclosure relates to a method for providing wait extension list selection.

BACKGROUND OF THE DISCLOSURE

Mobile communication device use has grown and continues to grow with the continued implementation of new technologies. A mobile communication device can provide different functionality such as a phone, a camera, a music player or data storage capacity for use with an address book application, a calendar application or an email application.

In order to keep track of all of their contacts, users are able to store contact information concerning different individuals in the mobile communication device address book. This contact information can include the individual's home address, work address, mobile phone number, email address and work phone number including extension.

Figure 1:
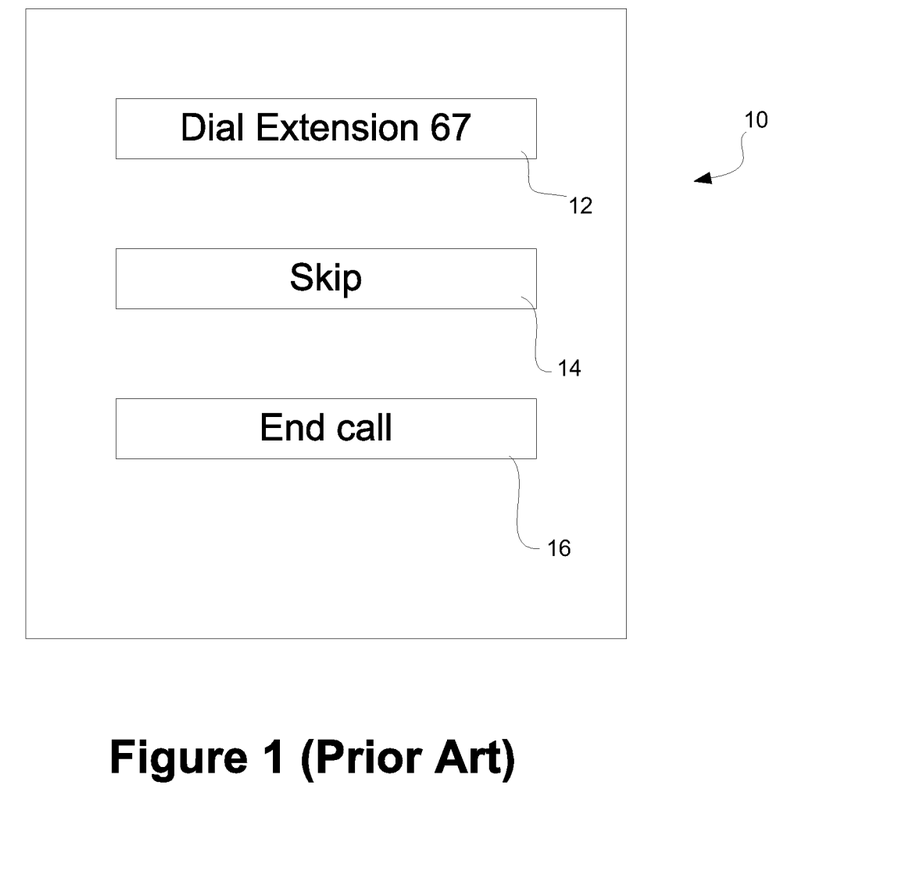
FIG. 1 is a schematic diagram of a prior art screen dialog for use in dialing an extension with a mobile communication device.

Currently, when a user calls an individual's number, and assuming there is an extension associated with this number, after the number is dialed, a dialog screen 10 is presented to the user (as shown in FIG. 1) which allows the user to either dial the extension via button 12, skip the extension entry via button 14 or end the call via button 16. If the user selects button 12 to dial the extension, selection of this button causes the mobile communication device to automatically dial the extension for the user.

It is, therefore, desirable to provide an improved method and apparatus for providing extension list selection.

BRIEF DESCRIPTION OF THE DRAWINGS

Implementations of the present disclosure will now be described, by way of example only, with reference to the attached Figures, wherein.

DETAILED DESCRIPTION

Generally, the present disclosure provides a system and method for providing extension list dialing.

The present disclosure is directed at a method and apparatus for providing extension list selection and dialing. When multiple extensions are associated with a single telephone number of address book entry are stored within a mobile communication device address book, they can then be presented to a user after the telephone number is dialed.

In a first aspect, the present disclosure provides a method of providing wait extension dialing in a mobile communication device comprising storing a plurality of extensions within a single address book entry; sensing dialing of a phone number associated with the single address book entry; sensing connection between the mobile communication device and the phone number to establish a call; and displaying a screen dialog with each of the plurality of extensions for selection of one of the plurality of extensions.

Other aspects and features of the present disclosure will become apparent to those ordinarily skilled in the art upon review of the following description of specific implementations of the disclosure in conjunction with the accompanying figures.

Figure 7:
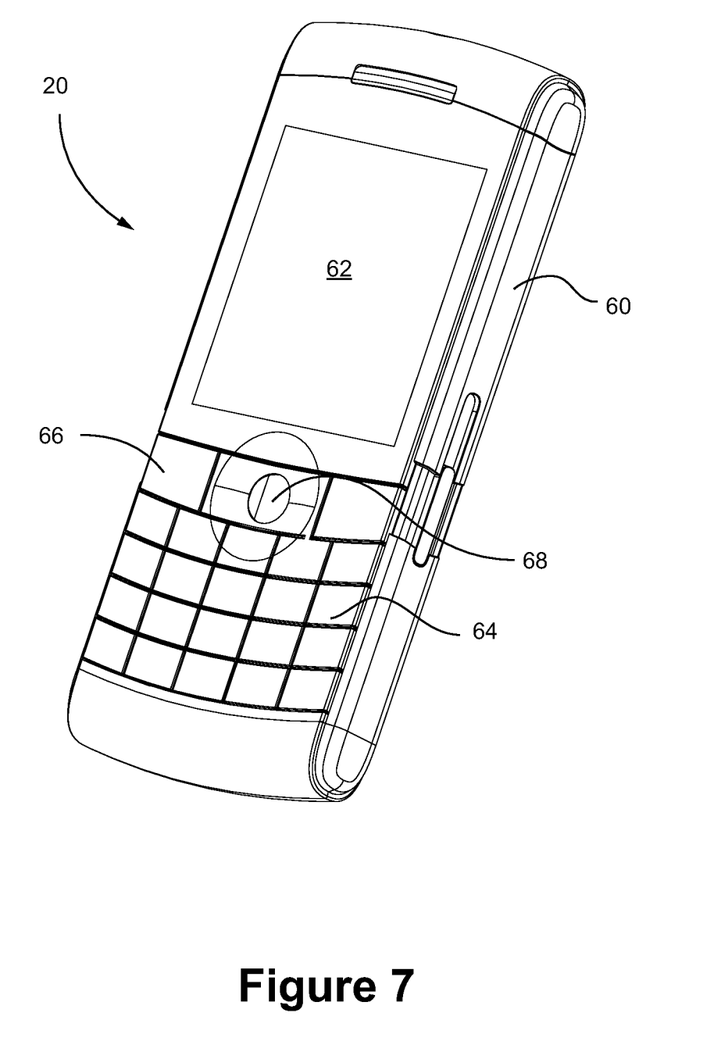
FIG. 7 is a schematic diagram of a mobile communication device.

Turning to FIG. 7, a perspective view of a mobile communication device is shown. The mobile communication device 20 has a body 60 which includes a display screen 62, a keyboard/keypad 64, a set of buttons 66 and a trackball 68. It will be understood that the trackball 68 can also be a joystick, scroll wheel, roller wheel, trackball or touchpad or the likes, or another button. As will be further understood by one skilled in the art, the device 20 includes other parts which are not shown or described.

Figure 2:
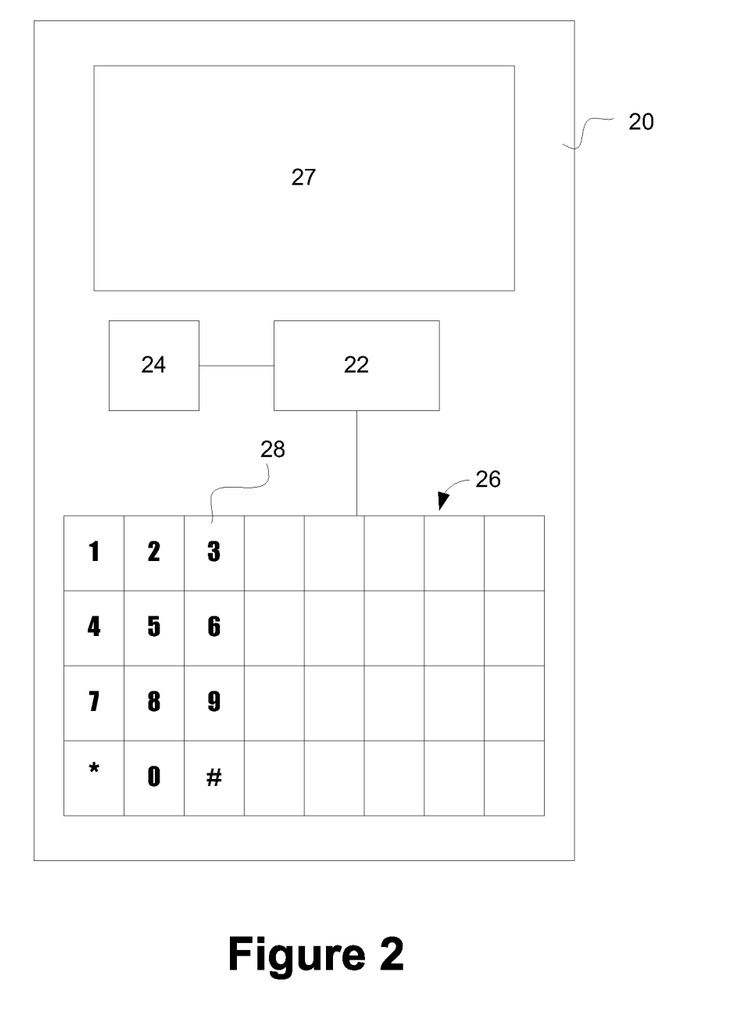
FIG. 2 is a schematic diagram of a mobile communication device.

Turning to FIG. 2, a schematic diagram of the mobile communication device for use with a system and method for providing extension list dialing is shown. The mobile communication device 20 further includes a processor 22, a database 24, a keyboard 26 and a display 27. The keyboard 26 preferably includes a keypad portion 28 or the capability for the user to use the keyboard 26 to dial a telephone number. Although shown as being external to the processor 22, the database 24 can also be located within the processor 22. As will be understood, only components of the device 20 which are necessary for implementation or execution of the system and method for providing extension dialing are shown and that not all components required for operation of the mobile communication device are shown.

Figure 3:
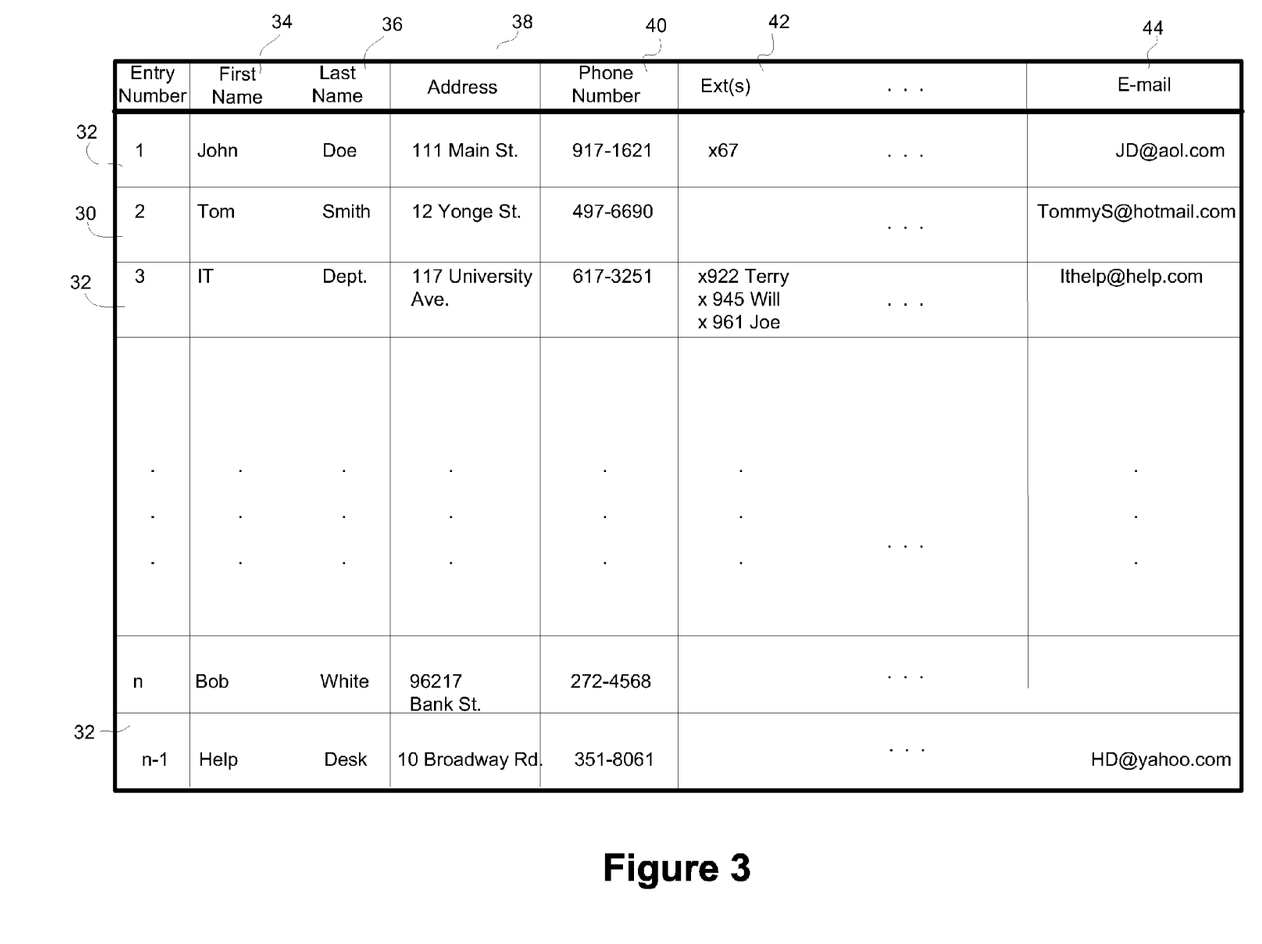
FIG. 3 is a schematic diagram of a database storing entries for a mobile communication device address book.

In one implementation, as schematically shown in FIG. 3, a table 30, which schematically represents the information stored within the address book of the mobile communication device, is stored within the database 24. As will be understood, the table 30 shown in FIG. 3 is simply representative of one way to store address book information and that other storage methods are contemplated both with respect to the information associated with each address book entry or the method of storage.

The table 30 includes a plurality of address book entries 32, whereby the entries 32 are numbered 1 to n (where n represents a predetermined maximum number of entries). The maximum number of entries can also be determined by the amount of memory allotted for address book storage. In the current table 30, each entry in the table 30 includes a first name section 34, a last name section 36, an address section 38, a phone number section 40, a phone number extension section 42 and an email section 44. Other sections can be included and it will be understood that the type information stored in each entry, as illustrated in FIG. 3, is not meant to be an exhaustive list.

Figure 4:
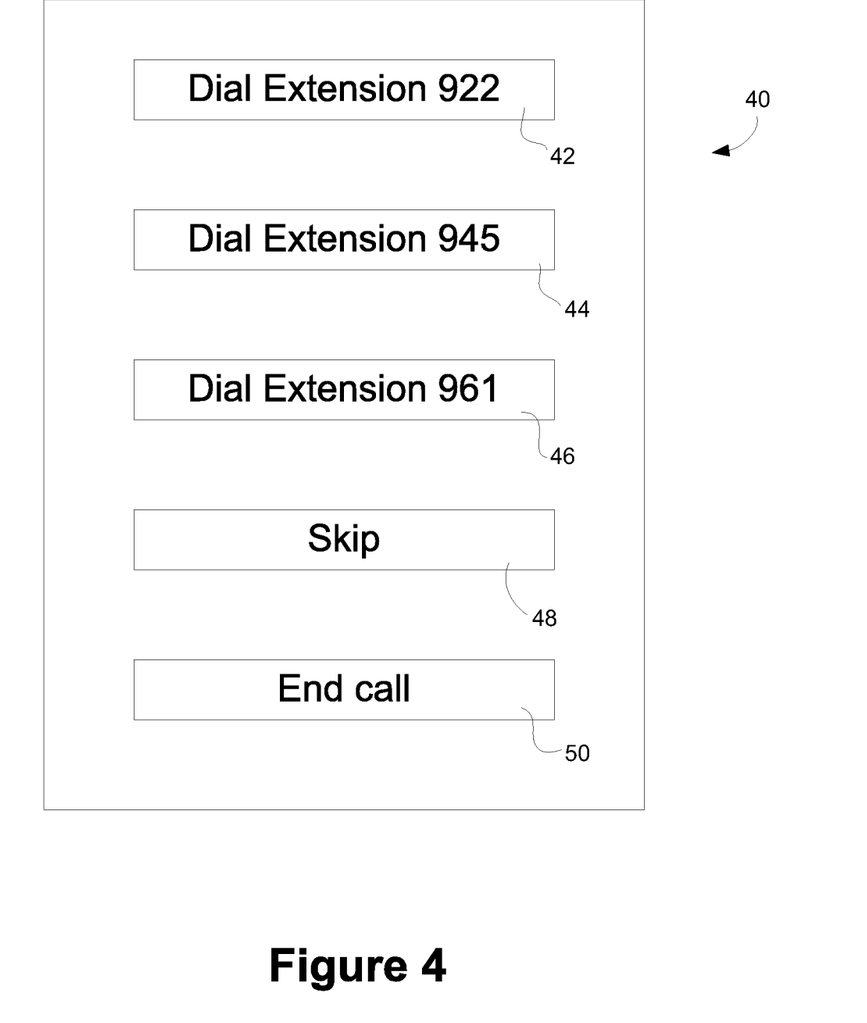
FIG. 4 is a schematic diagram of a screen dialog for use in extension list selection.
Figure 5:
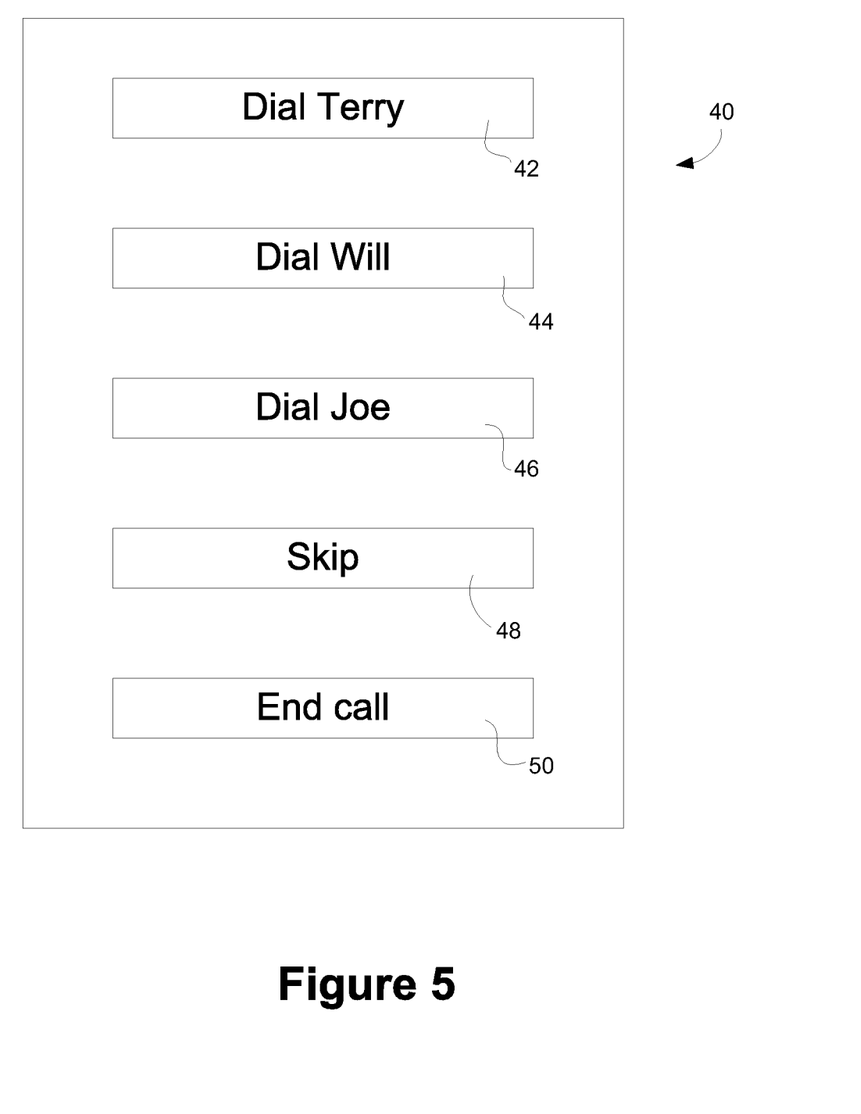
FIG. 5 is a schematic diagram of a second screen dialog for us in extension list selection.

With respect to entry 3 (IT Dept), a plurality of extensions are associated with the phone number for this entry. Storage of the plurality of extensions can be done in any number of ways. In one implementation, the extensions are stored in a delimited list so that they can all be displayed in a popup or screen dialog (such as shown in FIG. 4 or 5) that is presented to the user after a connection is achieved between the mobile communication device and the associated phone number. For instance, the phone number and phone number extension information can be stored as {617 3251 w "Terry" 922 ww "Will" 945 ww "Joe" 961} where the ww is used as a delimiter between different extensions. In an alternative storage method, where an address book entry includes an extension field, the extensions can be stored as {ww "Terry" 922 ww "Will" 945 ww "Joe" 961}. It will be understood that the delimiter "ww" can be replaced with any other delimiter that is acceptable or understood to be a wait list extension delimited by the mobile communication device. If the address book provides multiple extension field entries the information can be stored as (x "Terry" 922) for the first field, (x "Will" 945) for the second field and (x "Joe" 961) for the third field whereby the 'x' is optional since the device would already know that these are phone number extensions. In a further implementation, there are no names associated with the individual extensions.

In yet a further implementation, both x and ww delimiters can be used in a single address book entry. Use of x delimiters will be understood by one skilled in the art. The "w" is used and understood by most communication devices to provide the screen dialog of FIG. 1 and therefore the "ww" can be used to instruct the mobile device to display a list of all associated extensions. For instance, with the entry {617 3251x 67 ww "Terry" 922 ww "Will" 945 ww "Joe" 961}, FIG. 1 would be initially displayed to the user and if the user selects the Dial Extension 67 button 12, a second screen dialog, such as FIG. 4 or 5 is then displayed. Currently, the inclusion of the letter x in an address book entry prompts the device to display the screen or wait dialog.

Turning to FIG. 4, a schematic diagram of a screen dialog in accordance with an implementation of a system for providing a wait extension list selection dialog is shown. The screen dialog is associated with the table 30. In operation, after the user has dialed the number associated with entry 3 (617-3251) and a connection is established, the screen dialog 40 is shown. The user can then select which member of the IT Dept. to contact. For instance, the user can select extension 922 for Terry (button or option 42), extension 945 for Will (button or option 44), extension 961 for Joe (button or option 46), by-pass or skip the extension entering (button or option 48) or end the call (button or option 50). Alternatively, as shown in FIG. 5, the names of the individuals associated with the extensions is shown instead of the extension so that the user recognizes whom he/she is trying to contact. As shown in FIG. 5, the user can select Terry (button 42), Will (button 44), Joe (button 46), by-pass or skip the extension entering (button 48) or end the call (button 50).

Although listed as buttons, this is for mobile devices where the display is a touch screen. In an alternative implementation, the extensions or names are listed and can be selected via use of the trackball or keyboard using known methods.

Figure 6:
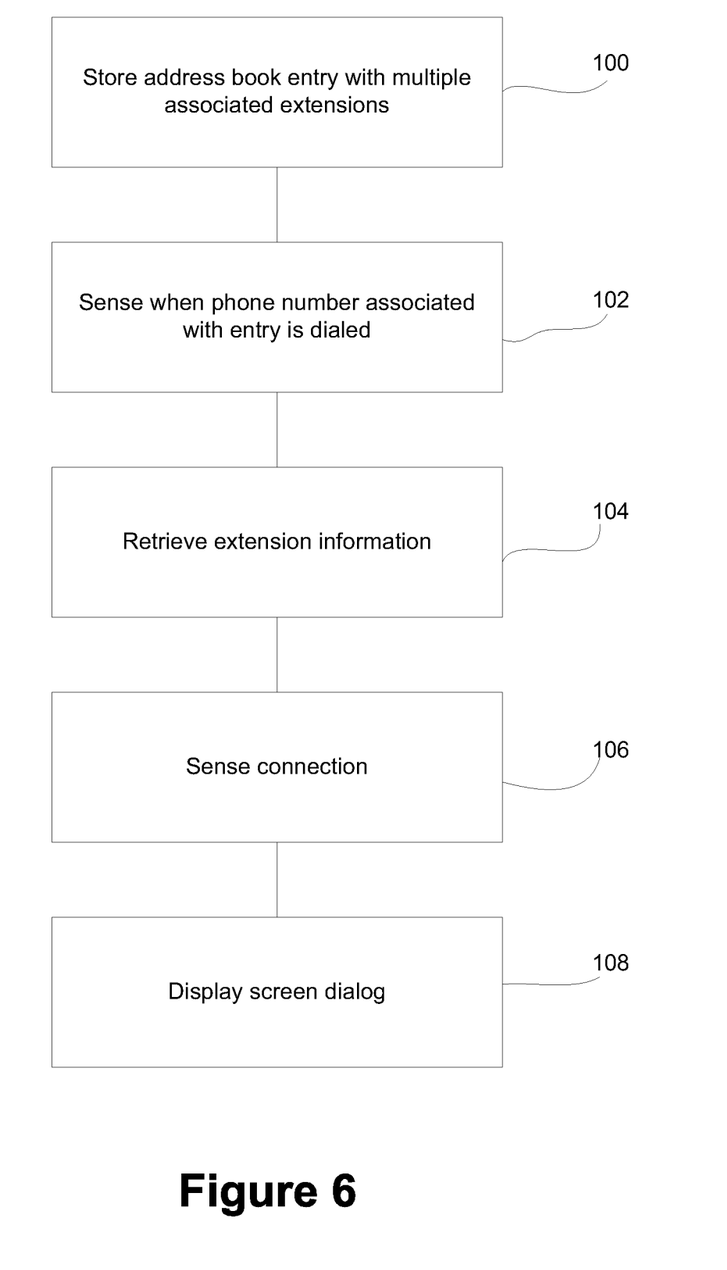
FIG. 6 is a flowchart outlining a method of extension list dialing.

Turning to FIG. 6, a flowchart outlining a method of providing extension list dialing or selection is shown. Firstly, an address book entry is entered 100 into the mobile communication device address book whereby the address book entry includes at least two different extensions associated with a telephone number. When the processor 22 senses 102 that the phone number associated with the address book entry is dialed, the processor 22 accesses 104 the database 24 to retrieve the extension information. After a connection is established between the mobile communication device and the telephony apparatus of the dialed number and the connection sensed 106 by the processor, the screen dialog 40 is then displayed 108 to the user on the display 27. The user can then select the desired extension and is connected by the telephony apparatus.

Implementations of the disclosure can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform a method according to an implementation of the disclosure. Those of ordinary skill in the art will appreciate that other instructions and operations necessary to implement the described disclosure can also be stored on the machine-readable medium. Software running from the machine-readable medium can interface with circuitry to perform the described tasks.

The above-described implementations of the disclosure are intended to be examples only. Alterations, modifications and variations can be effected to the particular implementations by those of skill in the art without departing from the scope of the disclosure, which is defined solely by the claims appended hereto.

What is claimed is:

1. A method of providing extension list dialing in a mobile communication device comprising:
storing a multiplicity of extensions within a single address book entry associated with a telephone number, and additionally storing for each of the extensions a different corresponding name;
sensing dialing of a phone number associated with the single address book entry;
sensing an establishment of a connection by the mobile communication device for the phone number; and
after sensing the establishment of the connection, displaying a screen dialog with a multiplicity of selectable indicators, each indicator representing one of the extensions, each indicator comprising a correspondingly stored name.

2. The method of claim 1 wherein displaying a screen dialog further comprises displaying an option for skipping extension entering.

3. The method of claim 1 wherein displaying a screen dialog further comprises displaying an option for ending the call.

4. The method of claim 1 wherein displaying a screen dialog further comprises displaying each of the plurality of extensions in a list.

5. The method of claim 1 wherein sensing the establishment of the connection further comprises:
retrieving extension information associated with the single address book entry.

6. The method of claim 1 wherein storing a plurality of extensions comprises:
storing the plurality of extensions with delimiters in said address book entry.

7. A method of providing extension list dialing in a mobile communication device comprising:
sensing a connection between the mobile communication device and a phone number called;
retrieving an address book entry associated with the phone number called, the address book entry storing a multiplicity of extensions and a multiplicity of names, each of the names corresponding to one of the extensions;

and
after sensing the connection, displaying a screen dialog with a multiplicity of selectable indicators, each indicator representing one of the multiplicity of extensions, and including a corresponding one of the multiplicity of names, each of the selectable indicators being selectable to select a represented one of the multiplicity of extensions.

8. The method of claim 7 wherein displaying a screen dialog further comprises displaying an option for skipping extension entering.

9. The method of claim 7 wherein displaying a screen dialog further comprises displaying an option for ending the call.

10. The method of claim 7 wherein displaying a screen dialog further comprises displaying each of the plurality of extensions in a list.

11. An apparatus for providing extension list dialing in a mobile communication device comprising:
a processor;
a database storing at least one address book entry with multiple extensions, and also storing for each of the extensions a corresponding individual name;
where when the processor senses a dialing of one of the at least one address book entries with multiple extensions, the processor then displays a screen dialog with a multiplicity of selectable indicators, each indicator representing one of the multiple extensions and including a corresponding one of the multiplicity of names, and after sensing a connection the processor responds to a selection of one of the indicators by selecting a corresponding one of the extensions.

12. The apparatus of claim 11 further comprising a keypad for dialing of a phone number.

13. The apparatus of claim 11 further comprising a display for displaying the screen dialog.

14. The apparatus of claim 11 wherein the database is located within the processor.

15. The apparatus of claim 11 wherein the database comprises a table for storing the at least one address book entries.

16. The apparatus of claim 15 wherein the table comprises an extension section for each of the at least one address book entries.

* * * * *